UNITED STATES PATENT OFFICE.

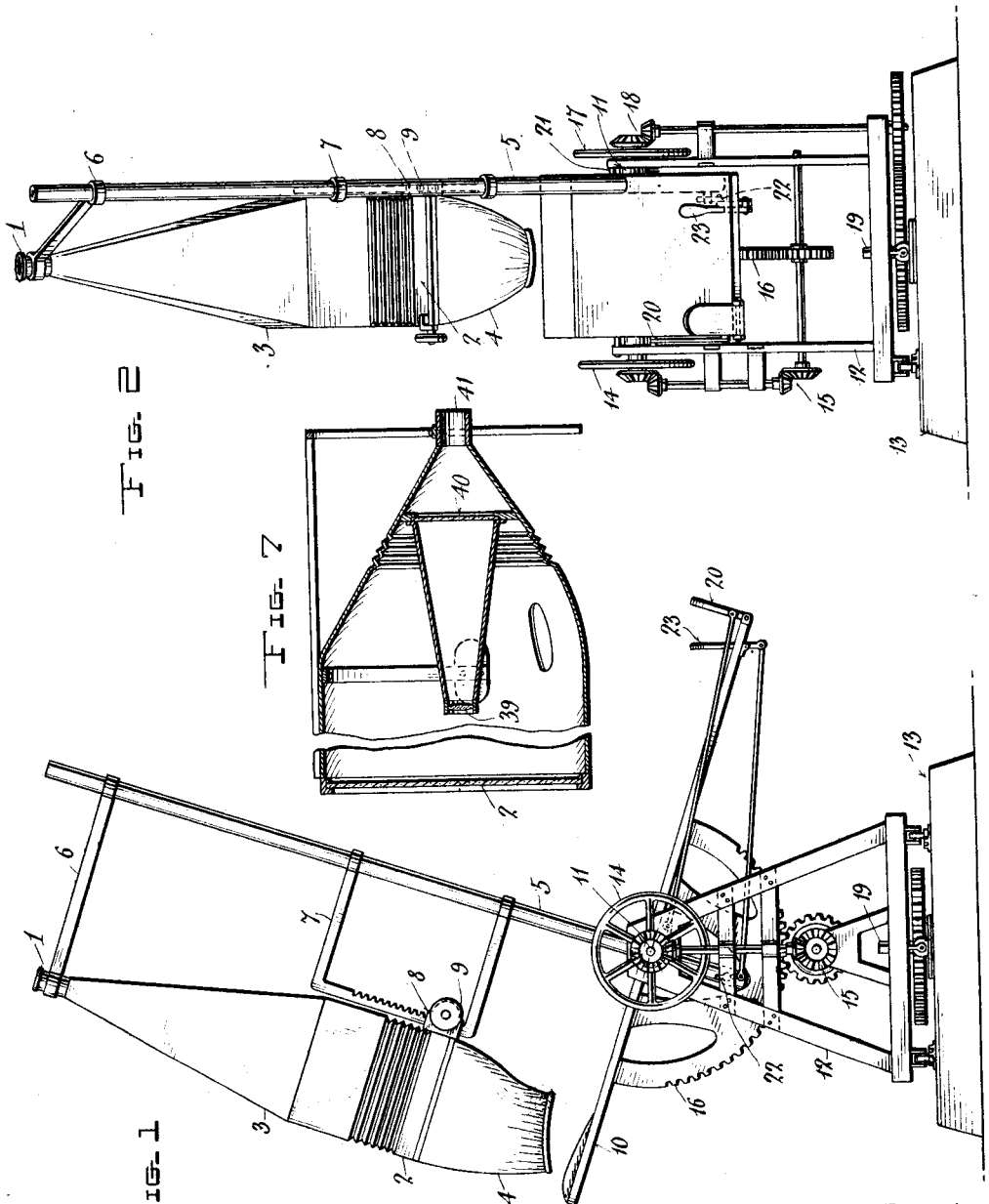

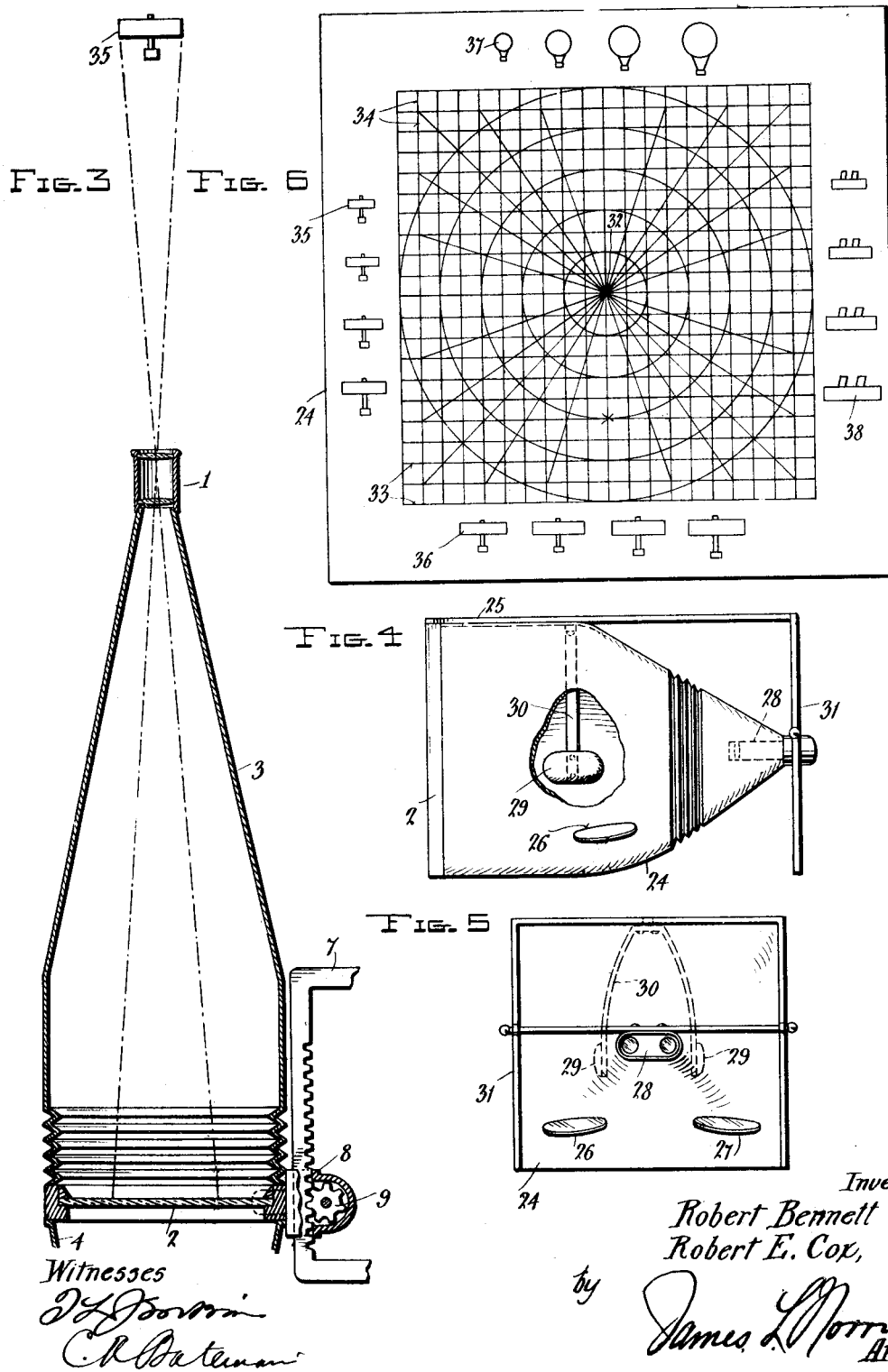

ROBERT BENNETT, OF NEW YORK, N. Y., AND ROBERT E. COX, OF ANNAPOLIS, MARYLAND.

SIGHTING, RANGE-FINDING, AND SPOTTING DEVICE FOR GUNS AND THE LIKE.

1,181,826.  Specification of Letters Patent.  Patented May 2, 1916.

Application filed April 17, 1915. Serial No. 22,200.

*To all whom it may concern:*

Be it known that we, ROBERT BENNETT and ROBERT E. COX, citizens of the United States, residing at New York city, in the county of New York and State of New York, and at Annapolis, in the county of Anne Arundel and State of Maryland, respectively, have invented new and useful Improvements in Sighting, Range-Finding, and Spotting Devices for Guns and the like, of which the following is a specification.

This invention relates to improvements in ordnance instruments, and more particularly to instruments adapted for use in determining the range of a target or object, sighting, and "spotting" or observing the fall of shot or projectiles from weapons of all kinds.

The primary objects of the invention are to provide an instrument which enables the gun or weapon to be sighted with facility and accuracy without the use of mechanism as heretofore required and which also affords a field of vision of such character as to enable more than one observer to view the target or object at one time, and of such size as will enable the observer or observers to continuously view the target or object and to spot the fall of the shot or projectile without interference by the discharge of the gun or other weapon.

The invention is especially applicable to guns adapted for the destruction of air craft of all kinds, it affording a relatively large field by which the object may be kept in view during flight, and by using a chart in connection with the field, the range and speed of the air craft may be quickly determined and the gun readily sighted and discharged accordingly.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a side elevation showing one embodiment of the present invention applied to a gun adapted for the destruction of air craft. Fig. 2 is an end elevation of the construction shown in Fig. 1. Fig. 3 represents a longitudinal section of the instrument as shown in Figs. 1 and 2. Figs. 4 and 5 show hoods adapted to be used in those cases where the instrument is applied to large guns. Fig. 6 is a detail view of the charted or graduated screen. Fig. 7 shows an arrangement whereby a direct rather than an inverted image is obtained.

Similar parts are designated by the same reference characters in the several views.

The present invention is applicable generally to small arms, large guns, and weapons or implements of various kinds employed to discharge a projectile, such as a shot, bomb, torpedo or the like, toward an object, it being shown as applied to a gun adapted for the destruction of aeroplanes and other air craft, as an example, as other uses and equivalent constructions are contemplated and will be included within the scope of the claims at the end of this specification.

The instrument, as shown, comprises a suitable lens 1, a screen 2 of ground glass or the like and upon which an image of the object is focused by the lens, a suitable light-excluding bellows 3 connecting the lens and screen, and a suitable hood 4 to darken the screen and thereby render clearly visible thereon the image of the object upon which the gun or other weapon is to be trained. These elements of the instrument are suitably supported in proper alinement and in predetermined relation with the gun or other weapon in connection with which the instrument is to be used.

In that embodiment of the invention shown in Figs. 1-3 inclusive, 5 represents conventionally the barrel of the gun, the lens being secured in fixed relation thereto by the support 6, and the screen is supported in fixed relation to the axis or bore of the gun by a bracket 7, the screen having a slide 8 which is shiftable in a direction toward and from the lens for focusing purposes, and a rack and pinion adjustment 9 may be provided within convenient reach of the gun pointer to enable the image of the object to be brought into proper focus upon the screen. The hood 4 excludes sufficient light from the screen to render the image of the object within the field of the instrument clearly visible thereon. As shown in Figs. 1–3 inclusive, the hood is adapted to serve for one observer, while the hood shown in Figs. 4 and 5, and which will be hereinafter described, enables three observers to simultaneously view the screen. As shown in Figs. 1 and 2, the optical axis of the instrument occupies a predetermined relation to the axis of the gun, it being fixed in parallelism therewith, in the present instance. A conventional form of mounting is provided for the gun and its instrument to facilitate sighting of the gun upon air craft with the aid of the instrument embodying this invention, the gun, as shown, being fixed to a platform 10 and upon which the gun sighter may lie in a reclining position. This platform is tiltable on a horizontal axis 11 to vary the degree of elevation of the gun, and it is rotatable about a vertical axis to permit movement of the gun in azimuth. As shown, the horizontal axis 11 supporting the platform is mounted in a frame 12 and the frame is rotatably supported by a turn-table 13. Tilting of the platform to vary the elevation of the gun may be conveniently effected by a hand-wheel 14 located at one side of the platform within reach of one hand of the gun sighter and connected by the gearing 15 to the sector 16 connected to the platform, and rotation of the platform to effect any desired movement of the gun in azimuth may be conveniently effected by a hand-wheel 17 located at the opposite side of the platform within reach of the other hand of the operator, this hand-wheel 17 being connected by the gearing 18 to a stationary vertical shaft 19, whereby rotation of the platform about a vertical axis relatively to the stationary base of the mounting is effected. Brakes 20 and 21 are shown for arresting the tilting movement of the platform or the rotary movement thereof and for holding the platform in any desired position, these brakes being set by a pedal operative by one foot of the gun sighter, and the trigger 22 which controls the firing of the gun is shown connected to a pedal 23 which may be operated as desired by the other foot of the gun sighter. In applying the invention to guns of this character, the hood 4 may be adapted to permit observation of the screen by one person only. However, in applying the instrument to larger guns, such as those used on board ships, or in fortifications, it is desirable that more than one person should observe the image of the object on the screen, as this provides instruction for all the observers, the sighting of the gun is checked by the different observers, and disablement of the gun sighter will occasion no delay in the use of the gun.

As shown in Figs. 4 and 5, the hood 24 is supported in proper relation to the screen by a suitable frame 25, and it is shown provided with two openings 26 and 27 to receive the heads of two persons, one of whom may actively sight and control the firing of the gun. Means is also shown in this form of the invention for magnifying any desired portion of the screen, for example, the image of the object appearing thereon. Such means in the present instance comprises a pair of binoculars 28 which are fitted adjustably in the rear end of the hood and may be focused upon any desired portion of the screen by the observing officer, thus providing means whereby the officer may at any time determine the conduct of the gun sighter, as well as means whereby such officer may examine the enlarged or magnified image with a view to determining the identity of the object or to obtain any other desired data pertaining to the object. In order that the heads of the observers occupying the openings 26 and 27 will not obstruct the view of the observer using the binoculars 28, a pair of head-rests 29 may be provided which, as shown, are supported in fixed relation within the hood by a frame 30. A bracket 31 is shown for supporting the binoculars in proper position in the rear end of the hood.

The screen 2 is appropriately marked or graduated to constitute a chart or diagram to indicate the point of aim of the gun. The calibrating or graduating of the screen to form the chart is preferably accomplished as follows:—The gun to which the instrument is attached is fired on a firing range to hit an appropriate target, the spot where the shot struck the target is marked on the screen as the point 32. The gun is then fired at an object or target located at different known distances and the horizontal cross lines 33 are then marked on the screen and suitable numerals applied, as shown, to indicate the lines corresponding to the different ranges. To compensate for wind or other horizontal deviations, the gun is fired under such conditions as would produce such deviations, and the vertical lines 34 are marked on the screen and suitable numerals applied, as shown, and representing miles or knots per hour.

In order to enable the observer to quickly determine the range of the object, series of graphic representations of different objects at varying ranges are provided, to be used in comparison with the image of a similar object on the screen, thus enabling the observer to aim the gun accordingly. In the present instance, a series of graphic representations 35 of a bi-plane as the same appears at different ranges is arranged at one margin of the screen, a series of graphic representations 36 of a monoplane as the same appears at different ranges is located at another margin of the screen, a series of graphic representations 37 of a dirigible balloon as the same appears at different ranges is located at another margin of the screen, and a series of graphic representations 38 of a battleship or other warship as the same appears at different ranges is located at another margin of the screen.

In using the instrument with the screen appropriately calibrated, the gun to which the instrument is connected in predetermined relation is adjusted, as to elevation and azimuth, to bring the image on the screen into a definite relation with the spot or point 32 on the screen, at which moment the gun is fired. At point blank range, this should occur when the image is superposed on or coincides with the spot or point 32, assuming that said spot or point is located with reference to the point blank fire of the gun, but where the object is distant, its range is determined either by the aid of the graphic representations of such objects, as described, or by the usual range finders, and the gun is then adjusted with relation to its elevation so as to bring the image of the object on the screen into register with the appropriate range-indicating line upon the screen, at which moment the gun is fired. Lateral deflection, due to wind or other causes, is similarly compensated for by swinging the gun in azimuth until the image of the object on the screen registers with the appropriate line on the screen, at which moment the gun is fired. Obviously, allowance may be made for range and lateral deflection, either separately or simultaneously.

Owing to the relatively large field include by the instrument, the same provides means whereby continuous observation of the image may be had, and this, notwithstanding the lateral recoil of the gun. This is very advantageous, as it provides the observers with means for determining the effect of the shots and for spotting the fall of the shots when the latter strike water, the resulting column of water arising being clearly visible on the screen and indicating to the observers the spot where the shot fell. The present invention also provides a range-finding, gun-sighting, and shot-spotting instrument wherein the image of the object is brought to a focus and is in a position that it may be simultaneously viewed by a number of observers, each using both eyes, no individual focusing for the different observers being necessary. Preferably, the screen is so calibrated as to locate the central point of focus in the center of the field. The calibrations on the screen are all in the same eye focus with the image on the screen. It is to be understood, of course, that the screen may be convex, spherical, or in any other shape to minimize distortion of the image produced on the screen, and that interchangeable or superimposed lenses may be used to increase or diminish the size of the field.

In order to secure a direct instead of an inverted image of the object, an arrangement, such as that shown in Fig. 7, may be used, it consisting in placing a lens 39 behind the screen 2 and locating a second screen 40 in rear of the lens, observation of the image on the second screen being had through the openings 41 in the rear of the hood.

Of course, it is to be understood that the hood may, in some cases, be in effect a dark room which would inclose the bodies of the observers.

What is claimed is:—

1. The combination with a gun, of a sighting instrument connected to and movable therewith, embodying a screen adapted to receive an image of an object and having a point of aim marked thereon in definite relation to the bore of the gun.

2. The combination with a gun, of a gun sight connected to and movable therewith, embodying a screen, means for producing thereon an image of an object, and means on the screen maintained in definite relation to the bore of the gun and adapted to coöperate with the image to determine the aim of the gun.

3. The combination with a gun, of a gun sight held in fixed relation with the gun and embodying a screen having marked thereon a point of aim located with reference to the line of fire of the gun, and means for projecting the image of an object onto the screen to coöperate thereon with said point of aim.

4. The combination with a gun, of a gun-sighting device having means for securing it in fixed relation to the axis of the gun and comprising a screen having a point of aim thereon located with reference to the line of fire of the gun and also calibrated to indicate lateral deflection, and means for projecting the image of an object onto the screen with reference to said point of aim and lateral deflection calibrations and in a position determined by the aim of the gun relatively to the object.

5. The combination with a gun, of a gun-sighting device mounted in fixed relation to the axis of a gun and comprising a screen having a point of aim thereon located with reference to the line of fire of the gun and also calibrated according to different ranges, and means for producing the image of an object on the screen with reference to said point of aim and range calibrations.

6. The combination with a gun, of a gun-sighting device connected to and movable with the gun and comprising a screen marked with a point of aim, graduations for different ranges and graduations for different lateral deflections, and means for projecting the image of an object onto the screen with reference to said point of aim and said range and deflection graduations.

In testimony whereof we have hereunto set our hands in presence of two subscribing witnesses.

ROBERT BENNETT.
ROBERT E. COX.

Witnesses:
C. A. BATEMAN,
CHAS. S. HYER.

Copies of this patent may be obtained for five cents each, by addressing the "Commissioner of Patents, Washington, D. C."